Oct. 26, 1954 F. A. SPORTELLI 2,692,825

COLOR CORRECTING IN PHOTOMECHANICAL PROCESSES

Filed Dec. 14, 1946

INVENTOR
Frank A. Sportelli
BY
Sawyer & Kennedy
ATTORNEYS

Patented Oct. 26, 1954

2,692,825

UNITED STATES PATENT OFFICE 2,692,825

COLOR CORRECTING IN PHOTO-MECHANICAL PROCESSES

Frank A. Sportelli, Woodside, N. Y., assignor to Colour Separation Techniques, Inc., Wilmington, Del., a corporation of Delaware Application December 14, 1946, Serial No. 716,321

1 Claim. (Cl. 95—5.1)

Figure 1:
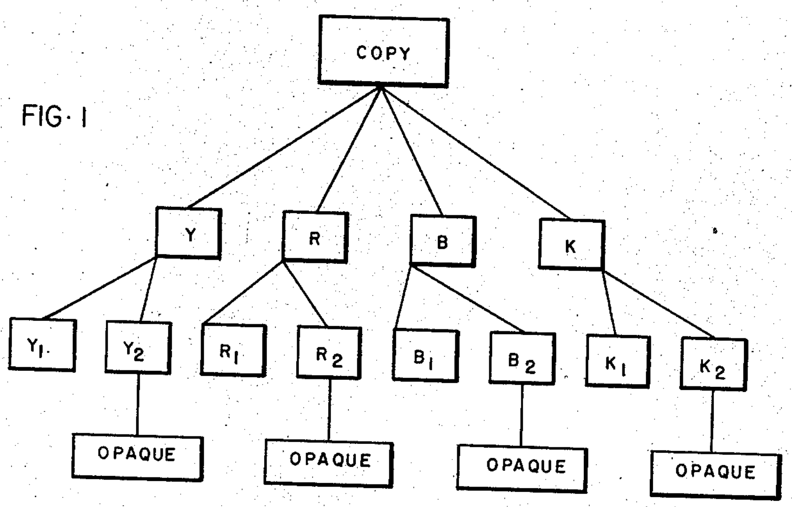

This invention relates to improvements in color correction.

In photo-mechanical printing processes, a plurality of color separations are prepared, utilizing optical color filters, and from these separations a corresponding plurality of printing surfaces are prepared, each printing surface being used with a different colored ink and the various color images being applied to the paper or other material to be printed, in registry. The necessity for color correction arises for a large variety of reasons. For example, the original color copy may be a color photograph in which the tints do not correctly represent the original, so that correction is necessary, or the color filters employed in making the separations may not match the colors of the inks employed in printing, so that an adjustment of color values is required.

The present invention provides a color correcting method utilizable in various types of printing, but will be described principally with relation to photogravure.

In multicolor photogravure printing, the color separation negatives are prepared either by photographing the subject directly or from a color transparency thereof, such as a "Kodachrome." For each color to be printed a resist is exposed, first through a screen having the desired pattern of dots or picture elements, and then through a positive transparency made from one of the color separation negatives. Color correction may be accomplished by retouching the positive, but the amount of labor involved is very great and the results obtained, particularly in reducing tone strength and in maintaining a proper line of demarkation between the various tints and tones and avoiding obliteration or distortion of fine detail within the retouched areas, leave much to be desired. Other methods of color correction, such as varying the tint of one of the inks employed, are open to very serious objections, among which may be noted: the fact that a number of pictures are often printed from a single set of cylinders requiring the same inks to be used for all pictures, so that correcting one picture by changing the tone of one of the inks will also vary the corresponding tone in pictures which require no correction; secondly, adjustment of one color may affect another, as, for example, if a green tone in a picture is corrected by altering the yellow ink which is used, such adjustment may affect adversely crimson tones of the same or other pictures.

While the difficulties involved in color correction by prior art methods are serious in conventional gravure, in which a uniform screen is used for exposing the resist, even greater difficulties arise when the so-called "Dultgen" process is utilized. In that process, there is substituted for the usual gravure screen a half-tone positive transparency made from the color separation negative and differing from the continuous tone positive transparency in that it is composed of a large number of separate dot elements which are of uniform opacity but vary in area according to the density to be produced. In the Dultgen process, the color density of the printed image is the product of the density of the continuous tone positive and the density of the half-tone positive which is used as a screen. While the continuous tone positive may be corrected by retouching, it is ordinarily not practical to correct the half-tone positive in this fashion for the reason that this would require individual retouching of a large number of practically microscopic dots. Accordingly, only half-way color correction may be obtained. Since density reduction of the continuous tone positive is impractical, a great deal of work must be done on the negative.

The present invention provides, however, a method of color correction which permits the accurate correction of tints and tones with full preservation of fine detail in the pictorial matter, and eliminating practically all need for laborious and fine retouching. In preparing a conventional photogravure printing surface and utilizing this method of color correction, steps such as indicated in Figures 1 and 2 of the drawing are followed.

Figure 2:
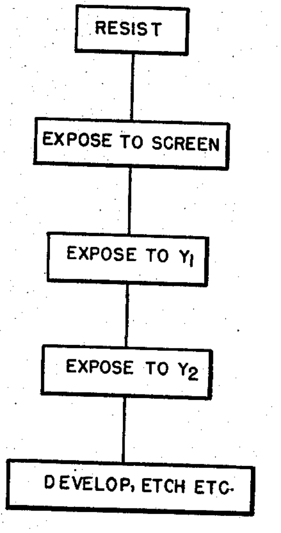

Figure 1 shows the preparation of the positives, in block diagram form. As there indicated, four multicolor separation negatives are made from the copy. These four negatives are identified by the letters Y, R, B and K, which stand for the colors yellow, red, blue and "key." The key color is utilized for building up type matter, black and shadow tones and for sharpening outlines, and may be a brown or a black. The key color separation may be prepared directly from the copy, as indicated, or from one or more of the other separations, utilizing well known methods. While four separations have been shown, it will be understood that the invention is applicable to processes using any number of separations for printing in any desired number of colors. In photogravure printing, a fifth cylinder is often prepared for a special tint and in offset printing the use of more than four colors is quite customary. As will be apparent from the following description, the invention contemplates and is applicable to color correction in processes utilizing any number of colors.

In preparing the yellow surface, for example, a "minus yellow" or blue filter is used. Yellow components of the picture will, accordingly, be represented by relatively transparent images, and blue components by relatively opaque or dense areas of the negative. When a positive is made from such a negative, the situation is reversed, yellow components being relatively opaque and blue components being relatively transparent. The treatment of the various color components for the various separations according to the present method will be described in detail after the elements employed have been referred to.

If a given color is to be left uncorrected, then only one positive need be prepared from the corresponding color separation. However, correction of all colors will ordinarily be desirable and I have shown my process as applied to correcting all colors utilized.

From each of the color separations two positives are prepared, these being identified as $Y_1$, $Y_2$ for the yellow color, $R_1$ and $R_2$ for the red color, etc. One of these positives, for each color ($Y_1$, $R_1$, etc.), is ordinarily utilized for exposing the resist without any further procedures being carried through, while the other is opaqued as to certain areas, Figure 1 indicating this step in the case of each of the positives identified as $Y_2$, $R_2$, $B_2$ and $K_2$.

Figure 2 illustrates the procedure followed in preparing the printing surface for the yellow color, and it will be understood that the method employed for preparing the other surfaces is the same, except that the appropriate corresponding positives are substituted for $Y_1$ and $Y_2$. As indicated in Figure 2, the resist, which will typically be a piece of carbon tissue such as customarily utilized in photogravure work, is first exposed through a screen. This may be a conventional gravure screen or other screen made up of opaque dots or picture elements in a transparent field. The effect of this exposure is to render the carbon tissue, where exposed through the transparent field of the screen, insoluble, while the portions protected by the opaque dots of the screen will remain soluble. The resist, after exposure to the screen, is now exposed through the $Y_1$ positive which will have the result of rendering the dot elements, previously formed in the resist by the screen, insoluble in proportion to the light transmission through the areas of the positive to which they are exposed.

In utilizing the $Y_2$, positive, the areas which are correctly reproduced by the $Y_1$ positive are blocked out. In blocking out such areas, the usual opaquing materials may be employed. It will be found more convenient, ordinarily, however, to utilize a matte surfaced emulsion, so that this work may be done with a pencil. The carbon tissue is now given a further exposure through the $Y_2$ transparency, in registry with that of the $Y_1$ transparency, with the result that the areas which have been blocked out are not affected, while other areas are weakened, so that they will etch less deeply and the color strength will be reduced.

Where the color compensation method of the present invention is utilized in photogravure work, considerable latitude is present for the reason that the ultimate result is controllable to a large extent in the etching. Quantitative data as to the densities and corrections necessary cannot be stated and are unnecessary, as the judgment of the operator may be utilized as in ordinary retouching. The present method, however, substitutes for all or a major part of the hand retouching, which has heretofore been necessary, a very simple method of photographic color correction.

By way of indicating relative values, certain typical conditions which have been found satisfactory may, however, be stated. Where a first or normal positive ($Y_1$, $R_1$, $B_1$, or $K_1$) having a density range (Marshall densitometer) of, say, .30 in the highlights and 1.5 in the shadow areas is utilized, the color correcting or compensating positive ($Y_2$ etc.) may be considerably thinner and flatter, having a corresponding density range of from .25 in the highlights to, say, .80 in the shadows.

As before stated, the $Y_1$ (or corresponding positive for the other colors), which is substantially a normal photogravure positive, will require retouching only in the areas where color is to be added, color subtraction being performed by means of the compensating positive $Y_2$. Ordinarily it will be sufficient to expose all areas of the $Y_2$ (or other compensating positive) which have not been blocked out, to the same extent. Where additional differentiation is required, the density of some areas of this positive may be built up by dyeing in the usual way, so that a further tone differentiation is obtained in the areas where color strength is reduced.

The primary condition which is practically always present and which requires correction, is the reproduction in a positive made from the color separation of components produced by colors other than the proper one. This characteristic is inherent in the separation negative itself. In analyzing the color error and making the necessary corrections therefor, a standard set of color patches may be photographed along with the copy so as to appear in the margin of the color separation. Where the original copy is a transparency, a set of transparent patches will be utilized. In either case, the set of color patches will comprise a set of five blocks or squares colored yellow, red, blue, black and white. The images of these blocks produced in the color separation negative and in the color separation positives made therefrom, indicate the error and the correction which is necessary. The colors utilized for the color patches will approximate as closely as possible to the ink colors which are used. If a set of theoretically perfect optical filters were possible, and a perfect match could be obtained between the filters and the corresponding inks utilized, a positive made from a color separation would reproduce the patch corresponding to the given color as a relatively opaque area and patches corresponding to the other colors would be transparent or substantially so. However, such conditions are not obtainable. Taking the yellow color as illustrative, the density of the blue and red patches on a normal positive made from the yellow separation will be only two or three steps removed on a gray scale from the density of the yellow color patch. To the extent that there is any density in the red or blue patches, the positive will tend to reproduce as a yellow image in the final printed material, images and image components of the original copy which are actually red or blue. Since on the normal gray scale each step represents a density increase of 40% (or reduction of 30%), and two steps represent a doubling or halving of the density, the normal tendency is for the positive prepared from a color separation to reproduce undesired colors to an extent which may be as much as 50% of the wanted color. While there is considerable tolerance in photogravure, as in all photographic and similar processes, the reproduction of an unwanted color to half the extent that the wanted color is reproduced is excessive. If the degree to which the unwanted color is reproduced is reduced to ⅙ of that of the wanted color or less, a satisfactory condition is, to all intents and purposes, obtained. This reduction is accomplished in the method of the present invention by the color compensating or correcting positive and will be understood by considering, in the first instance, a very simple case involving entirely separate colors, such as represented by the color patches. As before stated, the color patches representing unwanted colors may have a density which is as much as half of the wanted color. In such case, if a printing surface is prepared from the normal yellow positive, including the patches in the margin thereof, the yellow color patch will print as a strong yellow, while the red and blue color patches will print to approximately half the strength. Since the surface prints with yellow ink, the blue and red color patches will, of course, appear in yellow. If now the yellow color patch is blocked out on the compensating positive, and the carbon tissue is exposed also to the compensating positive as well as the normal positive, a printing surface will be produced in which the yellow patch prints a strong yellow as before. However, by regulating the length of exposure to the color compensating positive, it is obvious that the images of the blue and red color patches may be reduced to any desired degree. Complete obliteration of these images is ordinarily not necessary, but the exposure is carried to a point where their density is reduced to such a point that the printing surface areas corresponding to them will print such a weak yellow that the distortion in color values resulting will be negligible.

Pictorial matter to be reproduced may, in some cases, be as simple as the color patches already discussed or may be approximately this simple for some one or more of the colors. This situation occurs where only a few sharply defined areas of the picture contain a given color component or contain it to an extent which must be taken into account. If these areas are blocked out on a color compensating positive ($Y_2$ etc.) the compensating exposure will eliminate any distortion resulting from the red and yellow components and no further correction will be necessary.

Intermediate cases may occur to some extent, and in such cases, certain areas of the $Y_2$ positive or other compensating positive may be strengthened by dyeing or otherwise increasing the density to a desired degree but without rendering such areas opaque.

A point which should be emphasized is that accurate color control of very small areas is possible with the method of the present invention without accurate or detailed retouching work being required. For example, an article or object such as a necktie or a piece of textile material may be in blue with a very fine pattern of yellow, it being assumed that the blue and yellow correspond to the process colors used. In such case, the yellow separation and hence the normal yellow positive will tend to print a relatively weak but still objectionable yellow in the blue areas, distorting such areas toward the green. The yellow areas are blocked out on the $Y_2$ positive, thus reducing the undesired yellow printing in the blue areas by the exposure to the $Y_2$ positive to an unobjectionable value while not disturbing the strength of the yellow image in the desired areas. It will be noted that even should there be some small error in registry in the two exposures, texture in the yellow areas will not be disturbed in any way since these areas are opaqued out during the second exposure. In the blue separation, a similar procedure will be followed except that in this case the blue areas will be blocked out in the color correcting or $B_2$ positive. In the red or $R_2$ compensating positive no part of the necktie will be blocked out, since any density whatever in this portion of the positive made from the red separation is a color error. The result will be that the exposure to the $R_2$ positive will remove any tendency of the red printing cylinder to put unwanted red into the yellow or blue, which otherwise would muddy the yellow or give the blue an unwanted purplish cast.

Ordinarily, the colors found in a picture do not correspond to any one of the process colors used in printing. For example, a red may be crimson, containing a suitable amount of yellow as well as red, or it may be toward a purple, containing considerable quantities of blue, or may be a deeper and duller red containing both yellow and blue. While on its face, such a situation presents much greater complication than the simple case just discussed, such complication is not, in fact, encountered in practice. In the instance just discussed by way of example, if it be assumed that the blue which is used has a purple cast and hence should contain some red, the only variation in the procedure outlined above which would be necessary would be opaquing the blue area on the $R_2$ positive as well as the $B_2$ positive.

The application of the method of the invention has been discussed primarily with reference to the correcting of color error resulting from the process by which color separations are made. Since this factor is practically always present, it is the factor of major importance. However, the method of the invention may also be utilized for correcting faulty color in the copy from which the separations are made and when so utilized permits a very simple correction and without destroying texture. Similar correction has been made in prior art methods only by laborious procedures, involving reduction of density in areas of the positive or retouching of the negative with a loss of texture.

One frequently necessary color correction of this type occurs in the shadow areas of a picture, which frequently if uncorrected, will have an objectionable red or purple tone. In such case, the shadow area in question is not blocked out on the $R_2$ positive, with the result that the red image in this area is reduced. At the same time, the corresponding area may be printed full strength on the key cylinder, the blue cylinder, or both, or color may be added in this area on either or both of the key and blue cylinders, resulting in the desired color values in the shadow area in question. Even in a shadow area there may be delicate detail which would be destroyed if the shadow area is corrected as to color by conventional retouching methods. The method of the present invention, however, does not destroy detail in such areas and does not require attention to be paid to such detail in preparing the positives, since only the outline of the area need be followed in blocking out of the compensating positives. The blacks, greys and similar tones of a picture, whether shadows, typed matter or other components, are frequently of importance, and in most cases are produced primarily by the key cylinder. Correction of the key "color" is done according to the method of the invention as in the case of the other colors. Where the key color is used for sharpening outlines, those portions of the image in which the full key strength is desired are blocked out on the $K_2$ positive and muddying and interference with the tones in other parts of the picture is eliminated. Where a black with a blue or other cast is desired, the blue or other component necessary is treated precisely as it would be treated in the case of a green or purple or other mixed color.

If the key color is regarded as a satisfactory black, it can be stated as a generality that it will not be disturbed by printing of the other colors in approximately equal percentages, and this condition will usually be realized automatically to such an extent that the effect on the key color of the other color images and the corrections made thereon may be neglected. Where consideration of the color components introduced in black, grey or similar areas or outlines is important, the correction to be made will be obvious, following the principles just outlined.

Where no color correction is employed other than the blocking out of areas on the compensating or $Y_2$ etc. positive, it may appear that the extent of differentiation in color depth and tint which is provided by the invention is quite limited. This is only superficially true, however. For example, in the $Y_2$ positive, certain areas will be blocked out and certain other areas will not be blocked out. When we come to the $R_2$ positive, the same condition will obtain, so that areas which are blocked out in the $Y_2$ positive may or may not be blocked out in the $R_2$ positive and the same is true as to the areas which have not been blocked out in the $Y_2$ positive. The areas of the picture to be reproduced, accordingly, may fall into any one of four classes, depending upon their treatment in the $Y_2$ and $R_2$ positives. When their treatment in the $B_2$ and $K_2$ positives is similarly taken into account, it will be apparent that there are sixteen different types of treatment to which any given area may be subjected. And it will be apparent to those skilled in the use of color that such a wide range is provided, particularly in cases where the colors are composite, as is usually the case, that almost any desired correction can be obtained. When the possibility of building up the density of certain areas of the compensating positives is taken into account, even if only one degree of strengthening is used, there are twenty-seven possible treatments to which a given area may be subjected. The retoucher is working, however, with only four correcting positives and the work to be done on each is very simple, requiring only a fraction of the time necessary where conventional methods are utilized. In actuality, where tone is to be built up with dye or otherwise in the compensating positive, it may be built up to any degree desired, so that the actual possibilities of color correction by the method of the invention are unlimited.

While the method of the invention eliminates practically all need for color correction by other methods, it may, nevertheless, be utilized in conjunction with any other desired retouching or color controlling technique. For example, color may be built up in weak portions of an otherwise correct area by any of the usual retouching techniques. Where full color strength is required, this work is very simple, involving no more than the use of a pencil upon a matte surfaced emulsion. Work may also be done on the negatives, but will ordinarily be unnecessary and will be avoided. Where such work has been done, and is not precisely correct, it may in many cases be corrected upon the positives precisely as though the error were an error in color values which was introduced photographically The method of the invention has been described as applied to photogravure, in which the etching resist is rendered insoluble by exposure to light and is accordingly prepared by exposure through a positive transparency. The method is also applicable to resists having the opposite characteristic as to solubility and which, therefore, require exposure through a negative. In such cases, the method of the invention may be carried through in the same way, with the exception that each pair of normal and compensating positives is used to prepare a negative instead of preparing the resist directly. Having made a color corrected negative from the $Y_1$ and $Y_2$ positives, for example, this negative may now be utilized without further correction for exposing such a resist.

The invention is also applicable to processes in which a resist is not prepared directly from the positives, but an intermediate photographic etching control element is prepared. In offset engraving, for example, where a negative is utilized for exposing the resist, the same process is followed as in photogravure, except that this negative is prepared by exposure to the normal and compensating positives. In either case, an etching control element having a color corrected image is provided and the procedure thereafter is conventional.

Photogravure is, of coures, an intaglio process in which the ink is deposited on the paper by picture elements which are depressions or cells in the printing surface. The method is also applicable to planographic or relief printing. In such case, as pointed out above, a color corrected negative, prepared in the same way as the carbon tissue resist utilized in photogravure, may be made and the procedure followed thereafter will be conventional.

Where a screened negative is required, the normal positive and compensating positive are utilized successively in the exposure of a negative utilizing the conventional half-tone or other camera and screen arrangement. This positive is then removed and the compensating positive is inserted into the camera and an additional exposure is given the negative, without disturbing the screen or other optical arrangements. It is found that the two exposures may be accurately registered and related, so that a half-tone negative in which the color density is represented by the area of the dots or picture elements in the usual way is produced. The procedure from this point will, of course, be conventional.

For simplicity, the color correction work is normally divided and has been described as divided between the normal positive and the compensating positive, color addition being done by retouching of the normal positive, while color subtraction and the location thereof by leaving areas open or partially open is ordinarily done on the compensating positive. It will be apparent, however, that, if desired, the procedure employed could in some cases be reversed as between the two positives. The order of exposure of the resist or other etching control element to the two positives is, of course, immaterial.

What is claimed is:

A set of positive transparencies for use in photomecnanical preparation of printing surfaces comprising a pair of registering color separation positives for each of a plurality of colors to be reproduced, each pair of positives comprising a normal positive and a relatively thin and flat compensating positive, the color compensating positive having areas blocked out which correspond to areas of the normal positive in which the density correctly represents the color to be reproduced.

References Cited in the file of this patent

UNITED STATES PATENTS

| Number | Name | Date |
|---|---|---|
| 133,701 | Edwards | Dec. 10, 1872 |
| 465,178 | Hosch | Dec. 15, 1891 |
| 841,883 | Munch | Jan. 22, 1907 |
| 1,841,274 | Ballard | Jan. 12, 1932 |
| 2,084,353 | McNett | June 22, 1937 |
| 2,122,859 | Eaton | July 5, 1938 |

FOREIGN PATENTS

| Number | Country | Date |
|---|---|---|
| 24,128 | Australia | of 1929 |
| 680,675 | France | Jan. 22, 1930 |
| 494,372 | Germany | Aug. 26, 1933 |
| 495,761 | Germany | Aug. 26, 1933 |
| 341,028 | Great Britain | Jan. 5, 1931 |
| 402,332 | Great Britain | of 1933 |